United States Patent
Kobayashi et al.

(10) Patent No.: US 12,515,548 B2
(45) Date of Patent: Jan. 6, 2026

(54) SERVER APPARATUS AND SYSTEM

(71) Applicant: TOYOTA JIDOSHA KABUSHIKI KAISHA, Toyota (JP)

(72) Inventors: Ryosuke Kobayashi, Nagakute (JP); Koichi Watanabe, Tokyo-to (JP); Motofumi Kamiya, Nagoya (JP); Masaki Nishino, Anjo (JP); Jean-Sebastien Boire, Yokohama (JP); Takuya Nishioka, Nagoya (JP); Yohei Nakanishi, Nagoya (JP); Masaki Makihara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 18/436,020

(22) Filed: Feb. 8, 2024

(65) Prior Publication Data

US 2024/0294080 A1   Sep. 5, 2024

(30) Foreign Application Priority Data

Mar. 1, 2023 (JP) .................. 2023-031416

(51) Int. Cl.
| | |
|---|---|
| *B60L 53/30* | (2019.01) |
| *B60L 53/60* | (2019.01) |
| *B60L 53/66* | (2019.01) |
| *B60L 53/68* | (2019.01) |
| *B60L 58/10* | (2019.01) |
| *B60L 58/12* | (2019.01) |

(52) U.S. Cl.
CPC ............. *B60L 53/305* (2019.02); *B60L 53/60* (2019.02); *B60L 53/66* (2019.02); *B60L 53/68* (2019.02); *B60L 58/10* (2019.02); *B60L 58/12* (2019.02); *B60L 2240/60* (2013.01)

(58) Field of Classification Search
None
See application file for complete search history.

(56) References Cited

U.S. PATENT DOCUMENTS

| | | | |
|---|---|---|---|
| 2017/0129359 A1* | 5/2017 | Dunlap | ................... B60L 53/14 |
| 2019/0126768 A1 | 5/2019 | Niwa et al. | |
| 2021/0295619 A1* | 9/2021 | Tsuchiya | ................. B60L 53/62 |
| 2022/0105829 A1* | 4/2022 | Nakagawa | ........... G01R 31/367 |
| 2022/0281343 A1* | 9/2022 | Yang | ..................... B60L 53/305 |
| 2023/0234476 A1* | 7/2023 | Higashitani | ....... H01M 10/6571 701/22 |
| 2024/0010094 A1* | 1/2024 | Choi | ....................... B60L 58/12 |
| 2025/0018818 A1* | 1/2025 | Swaminathan | ....... B60L 53/665 |

FOREIGN PATENT DOCUMENTS

JP    2019086841 A    6/2019

* cited by examiner

*Primary Examiner* — Vivek D Koppikar
*Assistant Examiner* — David Ruben Pedersen
(74) *Attorney, Agent, or Firm* — KENJA IP LAW PC

(57) ABSTRACT

A server apparatus includes a communication interface and a controller configured to communicate using the communication interface and transmit, to a vehicle to be charged, information on a travel route according to a position of the vehicle to be charged such that the vehicle to be charged, which travels using power of a battery, arrives at a power supply point to receive power supply a predetermined time period before a scheduled time for the power supply and temperature of the battery on arrival is a predetermined temperature.

11 Claims, 2 Drawing Sheets

SERVER APPARATUS AND SYSTEM

CROSS-REFERENCE TO RELATED APPLICATION

This application claims priority to Japanese Patent Application No. 2023-031416, filed on Mar. 1, 2023, the entire contents of which are incorporated herein by reference.

TECHNICAL FIELD

The present disclosure relates to a server apparatus and a system.

BACKGROUND

Battery electric vehicles (BEVs) or the like powered by batteries may run out of power while traveling. Various technologies for eliminating or avoiding such situations have been proposed. For example, Patent Literature (PTL) 1 discloses a technology to charge a vehicle running out of power from another vehicle.

CITATION LIST

Patent Literature

PTL 1: JP 2019-086841 A

SUMMARY

There is room for improving efficiency of power supply when a power supply vehicle or the like supplies power to a vehicle to be charged to receive the power supply.

It would be helpful to provide a server apparatus or the like that enables to improve efficiency of power supply to a vehicle to be charged.

A server apparatus in the present disclosure includes:
a communication interface; and
a controller configured to:
  communicate using the communication interface; and
  transmit, to a vehicle to be charged, information on a travel route according to a position of the vehicle to be charged such that the vehicle to be charged, which travels using power of a battery, arrives at a power supply point to receive power supply a predetermined time period before a scheduled time for the power supply and temperature of the battery on arrival is a predetermined temperature.

A system in the present disclosure includes:
a vehicle to be charged configured to travel using power of a battery; and
a server apparatus configured to communicate with the vehicle to be charged,
wherein the server apparatus is configured to transmit information on a travel route according to a position of the vehicle to be charged such that the vehicle to be charged arrives at a power supply point to receive power supply a predetermined time period before a scheduled time for the power supply and temperature of the battery on arrival is a predetermined temperature, and
the vehicle to be charged is configured to receive the information on the travel route.

According to the server apparatus or the like in the present disclosure, efficiency of power supply to a vehicle to be charged can be improved.

BRIEF DESCRIPTION OF THE DRAWINGS

In the accompanying drawings.

DETAILED DESCRIPTION

An embodiment will be described below, with reference to the drawings.

Figure 1:
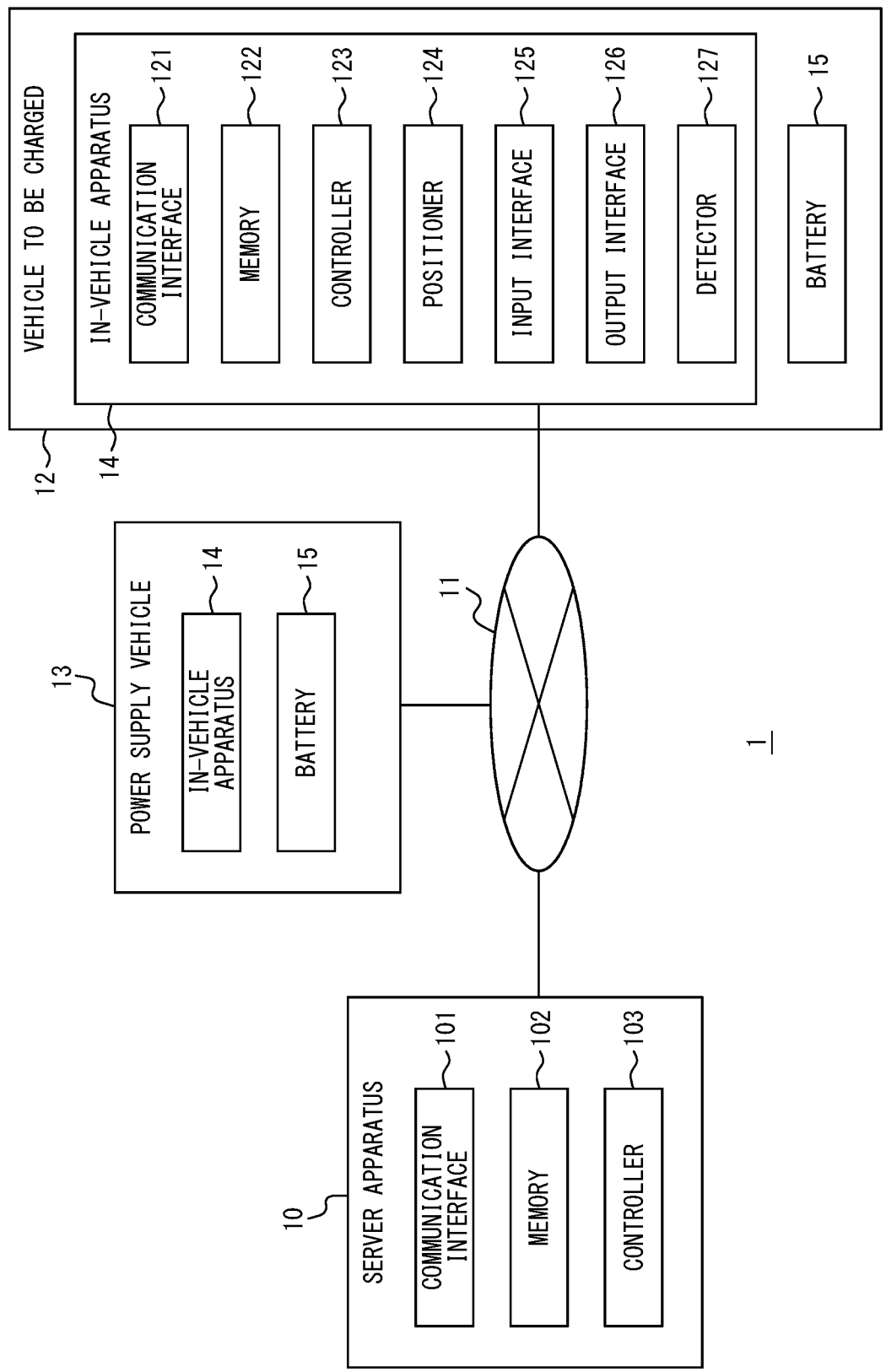
FIG. 1 is a diagram illustrating an example configuration of a vehicle management system.

FIG. 1 is a diagram illustrating a configuration example of a vehicle management system in an embodiment. The vehicle management system 1 includes one or more each of a server apparatus 10, a vehicle 12 to be charged, and a power supply vehicle 13 communicably connected to each other via a network 11.

The server apparatus 10 is, for example, a server computer that belongs to a cloud computing system or other computing system and functions as a server that implements various functions.

The vehicle 12 to be charged is a passenger car or a commercial vehicle provided with communication functions and information processing functions and is connected to the network 11 via a mobile communication network. The vehicle 12 to be charged is any type of automobile driven by power of an on-board battery 15, such as a Battery Electric Vehicle (BEV), a Hybrid Electric Vehicle (HEV), or a Plug-in Hybrid Electric Vehicle (PHEV). In the present embodiment, the vehicle 12 to be charged receives power supply at the power supply station or from the power supply vehicle 13 when the battery 15 needs to be charged. The vehicle 12 to be charged may each be driven by a driver, or the driving may be automated at any level.

The power supply vehicle 13 is a passenger car or a commercial vehicle provided with communication functions and information processing functions and is connected to the network 11 via a mobile communication network. The power supply vehicle 13 has the same in-vehicle apparatus 14 and the battery 15 as the vehicle 12 to be charged, but the battery 15 in the power supply vehicle 13 includes a battery that stores power to supply power to the vehicle 12 to be charged. The power supply vehicle 13 is a BEV, HEV, PHEV, etc., driven by power from the on-board battery 15, but may also be a FCEV (Fuel Cell Electric Vehicle) or a gasoline-powered automobile.

The network 11 is, for example, the Internet, but may include an ad hoc network, a LAN, a metropolitan area network (MAN), or other networks, or any combination thereof.

In the present embodiment, the vehicle management system 1 is a system for supporting rush charging by the power supply vehicle 13 to the vehicle 12 to be charged in the event that the vehicle 12 to be charged suffers a power shortage. Insufficient power includes a condition in which the remaining battery charge is low enough that the vehicle 12 to be charged cannot perform one or more functions, including driving, or the remaining battery charge is below an arbitrary level, but may be a condition in which the user of the vehicle 12 to be charged arbitrarily determines that power needs to be supplied. Rush charging is a mode of supplying power by moving the power supply vehicle 13 to the position of the vehicle 12 to be charged and charging the battery 15 of the power supply vehicle 13 to the battery 15 of the vehicle 12 to be charged. In the vehicle management system 1, the server apparatus 10 performs a drive-by recharge by sending travel instructions to the power supply vehicle 13 to supply power to each of one or more vehicles 12 to be charged.

The server apparatus 10 includes a communication interface 101 and a controller 103 that communicates using the communication interface 101. The controller 103 transmits information on the travel route according to the position of the vehicle 12 to be charged to the vehicle 12 to be charged, which runs on the power of the battery 15, such that the vehicle 12 to be charged arrives at the power supply point to receive power supply a predetermined time period before the scheduled time for the power supply and the temperature of the battery 15 on arrival is a predetermined temperature. Even if the temperature of the battery 15 rises due to discharge as the vehicle 12 to be charged travels, the battery 15 can be cooled down while not charging or discharging of the battery 15 during the margin time period by traveling so as to arrive at the power supply point a predetermined time period before the scheduled time for the power supply (hereinafter referred to as the margin time period). When the vehicle 12 to be charged is traveling at the legal speed, the amount of discharge per hour of the battery 15 is limited to a certain level, so that even if the temperature rises due to discharge, the temperature on arrival at the power supply point is kept at a certain predetermined temperature (hereinafter referred to as the allowable temperature). If the temperature of the battery 15 is at an acceptable temperature, it can be cooled down in the extra time period to a temperature suitable for charging, i.e., a temperature at which good charging efficiency can be obtained. Thus, a decrease in charging efficiency due to a rise in the temperature of the battery 15 can be avoided, enabling an improvement in the power supply efficiency of the vehicle 12 to be charged.

The following is an example configuration of the server apparatus 10, the vehicle 12 to be charged, and the power supply vehicle 13.

The server apparatus 10 includes a communication interface 101, a memory 102, and a controller 103. The server apparatus 10 may be a single computer or may be two or more computers that are communicably connected to each other and operate in cooperation. The configurations illustrated in FIG. 1 can be appropriately arranged on two or more computers in a case in which the server apparatus 10 is configured by two or more computers.

The communication interface 101 includes one or more interfaces for communication. The interface for communication is, for example, a LAN interface. The communication interface 101 receives information to be used for the operations of the controller 103 and transmits information obtained by the operations of the controller 103. The server apparatus 10 is connected to the network 11 by the communication interface 101 and communicates information with the vehicle 12 to be charged or the power supply vehicle 13 via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the controller 103 and information obtained by the operations of the controller 103.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to operations of the server apparatus 10 while controlling components of the server apparatus 10.

The functions of the server apparatus 10 are realized by a processor included in the controller 103 executing a control program. The control program is a program for causing a computer to execute the processing of steps included in the operations of the server apparatus 10, thereby enabling the computer to realize the functions corresponding to the processing of the steps. That is, the control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

The vehicle 12 to be charged has an in-vehicle apparatus 14 and a battery 15. The in-vehicle apparatus 14 includes a communication interface 121, a memory 122, a controller 123, a positioner 124, an input interface 125, an output interface 126, and a detector 127. One or more of these parts may be configured as a single control apparatus, or may be configured as a terminal apparatus such as a smartphone, tablet terminal, or navigation device. Alternatively, each component may be connected via an in-vehicle network compliant with a standard such as controller area network (CAN) to enable communication of information. The battery 15 is one or more lithium-ion batteries, for example, that charge and discharge power to drive the vehicle 12 to be charged.

The communication interface 121 includes one or more interfaces for communication. Examples of the interface for communication include an interface corresponding to mobile communication standards, such as Long Term Evolution (LTE), 4th Generation (4G), or 5th Generation (5G). The communication interface 121 receives information to be used for the operations of the controller 123 and transmits information obtained by the operations of the controller 123. The controller 123 connects to the network 11 using the communication interface 121 through a mobile communication base station and communicates information with the server apparatus 10 and the like via the network 11.

The memory 122 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 122 functions as, for example, a main memory, an auxiliary memory, or a cache memory. The memory 122 stores information to be used for the operations of the controller 123 and information obtained by the operations of the controller 123.

The controller 123 includes one or more processors, one or more dedicated circuits, or a combination thereof. Examples of the processor include a general purpose processor such as a CPU and a dedicated processor dedicated to specific processing. The dedicated circuit is, for example, an FPGA or an ASIC. The controller 123 executes information processing related to operations of the vehicle 12 to be charged while controlling components of the in-vehicle apparatus 14.

The positioner 124 includes one or more Global Navigation Satellite System (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioner 124 sends the positioning results to the controller 123, and the positional information of the vehicle 12 to be charged is obtained by the controller 123.

The input interface 125 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 125 accepts operations for inputting information to be used in the operations of the controller 123 and transmits the inputted information to the controller 123.

The output interface 126 includes one or more interfaces for output. The interface for output is, for example, a display or a speaker. The display is, for example, a Liquid Crystal Display (LCD) or an organic Electro Luminescent (EL) display. The output interface 126 outputs information obtained by the operations of the controller 123.

The detector 127 interfaces with or has one or more sensors that detect the status of various parts of the vehicle 12 to be charged. Sensors include, for example, sensors that detect the remaining battery capacity and temperature of the battery 15 and sensors that detect the state of motion (speed, forward/backward acceleration, left/right acceleration, deceleration, etc.) of the vehicle 12 to be charged. The temperature of the battery 15 is the temperature of any part of the battery 15, such as the outside of the enclosure or the inside of the enclosure. The detector 127 sends information indicating each state detected by the sensor to the controller 123.

The functions of the controller 123 are realized by a processor included in the controller 123 executing a control program. The control program is a program for causing a computer to execute the processing of steps included in operations of the controller 123, thereby enabling the computer to realize the functions corresponding to the processing of the steps. That is, the control program is a program for causing a computer to function as the controller 123. Some or all of the functions of the controller 123 may be realized by a dedicated circuit included in the controller 123.

The power supply vehicle 13 has an in-vehicle apparatus 14 equivalent to the vehicle 12 to be charged, and the above description of the in-vehicle apparatus 14 of the vehicle 12 to be charged applies. The battery 15 of the power supply vehicle 13 includes a battery that charges and discharges the power that feeds the vehicle 12 to be charged.

Figure 2:
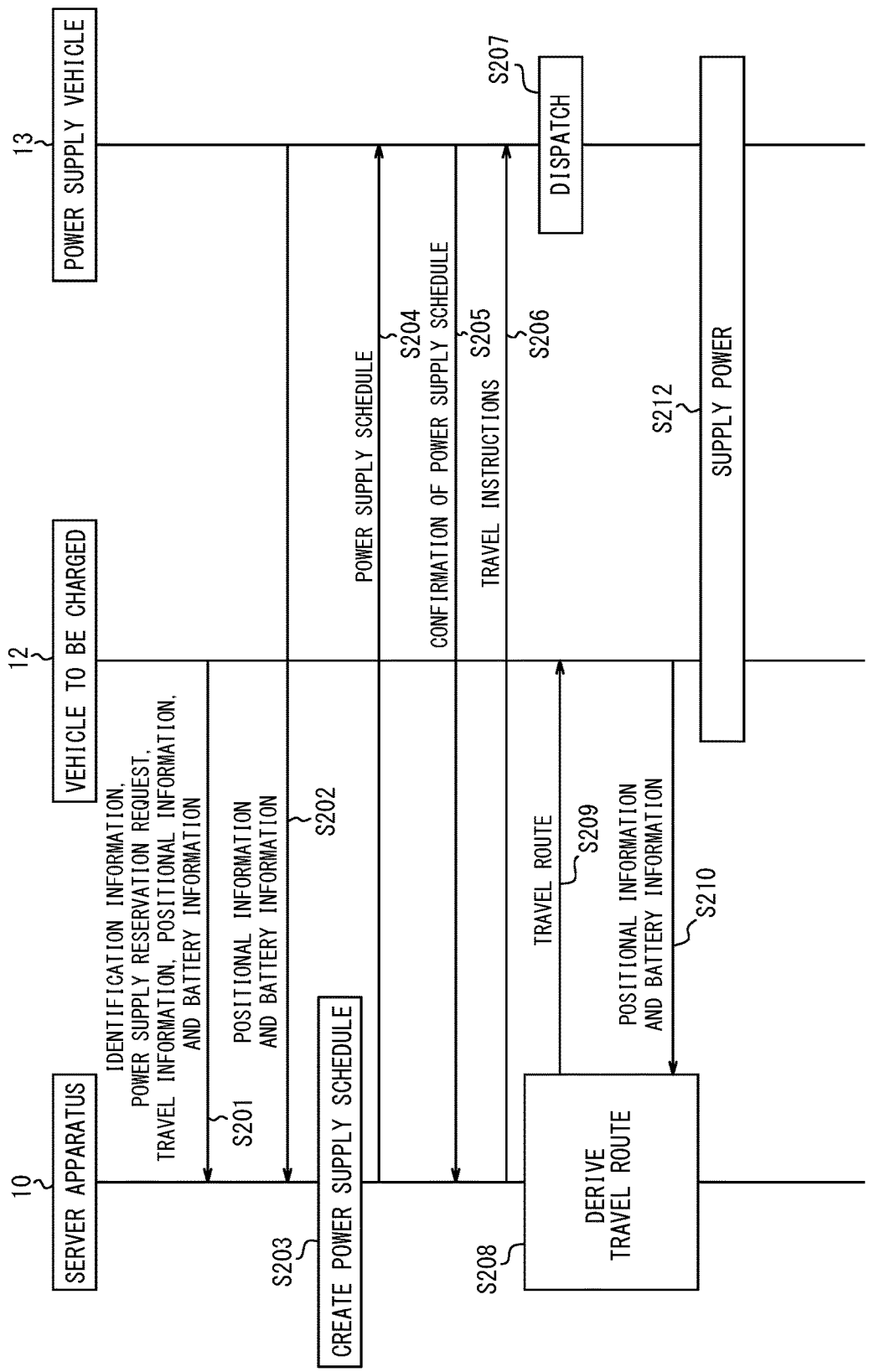
FIG. 2 is a diagram illustrating an example operation procedure of a server apparatus, a power supply vehicle, and a terminal apparatus.

FIG. 2 is a sequence diagram showing an example of a procedure for the coupled operation of the server apparatus 10, the vehicle 12 to be charged, and the power supply vehicle 13. The steps pertaining to the various information processing by the server apparatus 10, the vehicle 12 to be charged, and the power supply vehicle 13 in FIG. 2 are performed by the respective controllers 103, 123, 123. The steps pertaining to transmitting and receiving various types of information to and from the server apparatus 10, the vehicle 12 to be charged, and the power supply vehicle 13 are performed by the respective controllers 103, 123, 123 transmitting and receiving information to and from each other via the respective communication interfaces 101, 121, 121. In the server apparatus 10, the vehicle 12 to be charged, and the power supply vehicle 13, the respective controllers 103, 123, 123 appropriately store the information that is processed, transmitted and received in the respective memories 102, 122, 122.

The procedure in FIG. 2 is an example of a procedure when the server apparatus 10 dispatches a power supply vehicle 13 for rush charging to the vehicle 12 to be charged.

In step S201, the vehicle 12 to be charged sends identification information, power supply reservation request, travel information, positional information, and battery information to the server apparatus 10. The vehicle 12 to be charged sends the respective information to the server apparatus 10 when the remaining battery charge falls below an arbitrary criterion and power becomes insufficient, or when the user inputs instructions to the in-vehicle apparatus 14 to send a power supply request after determining that power supply is required. The criterion for determining power shortage is, for example, a SOC (State of Charge) value of 20% or less. The identification information is information that identifies the vehicle 12 to be charged. The power supply reservation request is information requesting the reservation of power supply opportunities by the power supply vehicles 13. Battery information includes the capacity, remaining capacity, and the temperature of the batteries 15. The movement information includes the destination and scheduled time of arrival of the vehicles 12 to be charged. Step S201 is performed for each of one or more of the vehicles 12 to be charged.

In step S202, the server apparatus 10 acquires the positional information and the battery information from one or more power supply vehicles 13. The server apparatus 10 requests each of the information for each of the power supply vehicles 13 toward one or more of the power supply vehicles 13 and acquires the information sent from each of the power supply vehicles 13 in response to the request. The battery information includes information on the capacity and remaining charge of the batteries 15.

In step S203, the server apparatus 10 creates a power supply schedule. The power supply schedule includes the power supply point at which power will be supplied and the scheduled time for the power supply. The power supply point is set at an arbitrary location. For example, the power supply point is set within a few hundred meters to a few kilometers around the destination of the vehicle 12 to be charged. The server apparatus 10 also selects the power supply vehicle 13 to travel to the power supply point. For example, the server apparatus 10 selects the power supply vehicle 13 with the largest remaining battery capacity among the power supply vehicles 13 located within an arbitrary distance range (e.g., several kilometers to a dozen kilometers) from the power supply point. Alternatively, the server apparatus 10 may select the nearest power supply vehicle 13 to the power supply point among the power supply vehicles 13 whose remaining battery capacity exceeds the predicted feed rate of the vehicle 12 to be charged. The predicted power supply amount of the vehicle 12 to be charged is derived, for example, from battery and movement information. Based on the position of the selected power supply vehicle 13, the server apparatus 10 derives the time at which the power supply vehicle 13 will travel at legal speed to arrive at the power supply point. The server apparatus 10 then sets any time after the arrival time as the scheduled time for the power supply. The scheduled time may be simultaneous with the arrival time or a few minutes to a dozen minutes later.

In step S204, the server apparatus 10 transmits the power supply schedule to the selected power supply vehicle 13. The power supply vehicle 13 outputs the information contained in the power supply schedule, for example, by display or other means, to prompt the occupants to confirm the information.

In step S205, the power supply vehicle 13 transmits a confirmation of the power supply schedule to the server apparatus 10. When the power supply vehicle 13 receives an input indicating that the occupant has confirmed the power supply schedule, it transmits a confirmation of the power supply schedule to the server apparatus 10 in response.

In step S206, the server apparatus 10 transmits travel instructions to the power supply vehicle 13. The travel instructions include information on the travel route to the power supply point and the travel start time at which the travel should start. The travel route is derived based on the power supply point and the position of the power supply vehicles 13. The travel start time is derived based on the travel route.

In step S207, the power supply vehicle 13 is dispatched in response to the travel instructions. When it is time to start traveling, the power supply vehicles 13 start traveling automatically according to the travel route. Alternatively, the power supply vehicle 13 displays the travel route to the occupants and starts traveling in response to the occupants' operation.

In step S208, the server apparatus 10 derives the travel route of the vehicle 12 to be charged. The travel route is the route from the position of the vehicle 12 to be charged to the power supply point, which is a distance such that the vehicle 12 to be charged will arrive at the power supply point a margin time period before the scheduled time for the power supply when traveling at the legal speed. Along with that, the travel route is a route of such a distance that the temperature of the battery 15 does not rise above the allowable temperature by the time of arrival when the vehicle 12 to be charged runs with the battery 15 continuously discharged. Allowable temperatures are, for example, 60° C. to 50° C. The margin time period is set as the time period that the battery 15 can be cooled down from the permissible temperature to a temperature suitable for charging, e.g., 20° C. to 30° C., while not charging or discharging. The margin time period is, for example, 15 to 30 minutes. The relationship between the travel distance and the behavior of the battery 15 temperature is derived in advance by simulation for each combination of the type of vehicle 12 to be charged and the type of battery 15, and stored in the memory 102. The server apparatus 10 uses such information and map information to derive a travel route using an arbitrary algorithm.

In step S209, the server apparatus 10 transmits information on the travel route to the vehicle 12 to be charged. The vehicle 12 to be charged outputs the travel route by display or other means, and the user drives the vehicle 12 to be charged according to the travel route, or instructs the in-vehicle apparatus 14 to drive part or more of the way. Depending on user preferences, the vehicle 12 to be charged can also travel without following a travel route.

As the vehicle 12 to be charged travels along the travel route or not following the travel route according to user preferences, the position, the remaining battery capacity and the battery temperature change. In step S210, the vehicle 12 to be charged transmits positional and battery information to the server apparatus 10. The server apparatus 10 then derives a travel route based on the latest position in step S208 and transmits the updated travel route information to the vehicle 12 to be charged in step S209. Steps S208, S209, and S210 are performed repeatedly in arbitrary cycles, e.g., tens of seconds to several minutes. In this way, the travel route of the vehicle 12 to be charged can be continuously optimized to ensure that the vehicle 12 to be charged arrives at the power supply point with the temperature of the battery 15 on arrival at an acceptable temperature a margin time period before the scheduled time. Alternatively, the server apparatus 10 may perform a route search prioritizing power consumption when the temperature of the battery 15 to be acquired reaches or exceeds the maximum allowable temperature limit. For example, if the number of times of acceleration/deceleration is high due to waiting for signals, etc. on the travel route, the frequency of rapid discharge increases, causing the temperature of the battery 15 to rise, and the server apparatus 10 can select a travel route with fewer signals, etc., so that the number of times of acceleration/deceleration is reduced. However, even when such a route is selected, the travel route is selected so that the vehicle arrives at the power supply point a margin time period before the scheduled time for the power supply.

When the vehicle 12 to be charged and the power supply vehicle 13 arrive at the power supply point and the scheduled time arrives, power is supplied from the power supply vehicle 13 to the vehicle 12 to be charged in step S212. For example, the power supply vehicle 13 charges the power for feeding the battery 15 or the power for feeding the battery 15 to the battery 15 of the vehicle 12 to be charged through the operation of the occupant or the automatic machine.

As described above, the battery 15 can be cooled down in the extra time period by driving so that the vehicle 12 to be charged arrives at the power supply point a margin time period before the scheduled time. Since the temperature of the battery 15 on arrival at the power supply point is kept at an acceptable temperature, the temperature of the battery 15 is sufficiently lowered at the scheduled time for the power supply to obtain good charging efficiency. In other words, it is possible to improve the power supply efficiency of the vehicles 12 to be charged. It is also possible to avoid a situation where the battery 15 deviates from its rated temperature range, which would cause it to deteriorate more easily.

In the above, the case in which the vehicle 12 to be charged receives power from the power supply vehicle 13 is illustrated, but the present embodiment is also applicable to the case in which the vehicle 12 to be charged receives power at a power supply station. In that case, the position of the power supply station is the power supply point, and a travel route is derived such that the vehicle 12 to be charged arrives at the power supply station a margin time period before the scheduled time for the power supply at the power supply station.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A server apparatus comprising:
a communication interface; and
a controller configured to:
communicate using the communication interface; and
transmit, to a vehicle to be charged, information on a travel route according to a position of the vehicle to be charged such that the vehicle to be charged, which travels using power of a battery, arrives at a power supply point to receive power supply a predetermined time period before a scheduled time for the power supply and temperature of the battery on arrival is a predetermined temperature, wherein
the predetermined time period is a time period within which the battery at the predetermined temperature, while not charging or discharging, can be cooled down to a temperature suitable for charging, and
the predetermined temperature is a temperature from which the battery, while not charging or discharging, can be cooled down to the temperature suitable for charging within the predetermined time period,
wherein the controller is configured to receive positional and battery information from the vehicle to be charged while the vehicle to be charged is traveling along the travel route,
upon determining based on the positional and battery information that the temperature of the battery reaches or exceeds a maximum allowable temperature limit before the vehicle to be charged arrives at the power supply point, perform a route search prioritizing power consumption to select another travel route such that the vehicle to be charged travels along the another travel route and arrives at the power supply point the predetermined time period before the scheduled time for the power supply, and
transmit information on the another travel route to the vehicle to be charged.

2. The server apparatus according to claim 1, wherein the controller is configured to transmit, to a power supply vehicle, instructions to travel to the power supply point by the scheduled time.

3. A system comprising:
a vehicle to be charged configured to travel using power of a battery; and
a server apparatus configured to communicate with the vehicle to be charged,
wherein the server apparatus is configured to transmit, to the vehicle to be charged, information on a travel route according to a position of the vehicle to be charged such that the vehicle to be charged arrives at a power supply point to receive power supply a predetermined time period before a scheduled time for the power supply and temperature of the battery on arrival is a predetermined temperature,
the vehicle to be charged is configured to receive the information on the travel route,
the predetermined time period is a time period within which the battery at the predetermined temperature, while not charging or discharging, can be cooled down to the temperature suitable for charging, and
the predetermined temperature is a temperature from which the battery, while not charging or discharging, can be cooled down to the temperature suitable for charging within the predetermined time period,
wherein the server apparatus is further configured to receive positional and battery information from the vehicle to be charged while the vehicle to be charged is traveling along the travel route,
upon determining based on the positional and battery information that the temperature of the battery reaches or exceeds a maximum allowable temperature limit before the vehicle to be charged arrives at the power supply point, perform a route search prioritizing power consumption to select another travel route such that the vehicle to be charged travels along the another travel route and arrives at the power supply point the predetermined time period before the scheduled time for the power supply, and
transmit information on the another travel route to the vehicle to be charged.

4. A method performed by a server apparatus, comprising:
transmitting, to a vehicle to be charged, information on a travel route according to a position of the vehicle to be charged such that the vehicle to be charged, which travels using power of a battery, arrives at a power supply point to receive power supply a predetermined time period before a scheduled time for the power supply and temperature of the battery on arrival is a predetermined temperature, wherein
the predetermined time period is a time period within which the battery at the predetermined temperature, while not charging or discharging, can be cooled down to a temperature suitable for charging, and
the predetermined temperature is a temperature from which the battery, while not charging or discharging, can be cooled down to the temperature suitable for charging within the predetermined time period,
wherein the method further comprises receiving positional and battery information from the vehicle to be charged while the vehicle to be charged is traveling along the travel route,
upon determining based on the positional and battery information that the temperature of the battery reaches or exceeds a maximum allowable temperature limit before the vehicle to be charged arrives at the power supply point, performing a route search prioritizing power consumption to select another travel route such that the vehicle to be charged travels along the another travel route and arrives at the power supply point the predetermined time period before the scheduled time for the power supply, and
transmitting information on the another travel route to the vehicle to be charged.

5. The server apparatus according to claim 2, wherein the controller is configured to select the power supply vehicle with largest remaining battery capacity among a plurality of power supply vehicles located within a predetermined distance range from the power supply point.

6. The server apparatus according to claim 2, wherein the controller is configured to select the power supply vehicle, which is nearest to the power supply point, among a plurality of power supply vehicles whose remaining battery capacity exceeds a predicted power supply amount of the vehicle to be charged.

7. The server apparatus according to claim 2, wherein the controller is configured to
derive, based on a position of the power supply vehicle, an arrival time at which the power supply vehicle traveling at legal speed arrives at the power supply point, and
set a time on or after the arrival time as the scheduled time for the power supply.

8. The server apparatus according to claim 1, wherein the travel route is a route of such a distance that the temperature of the battery does not rise above an allowable temperature by an arrival time when the vehicle to be charged runs with the battery continuously discharged.

9. The server apparatus according to claim 8, wherein
the allowable temperature is 50 to 60 degrees Centigrade,
the temperature suitable for charging is 20 to 30 degrees Centigrade, and
the predetermined time period is 15 to 30 minutes.

10. The server apparatus according to claim 1, wherein the controller is configured to
receive positional and battery information from the vehicle to be charged while the vehicle to be charged is traveling along the travel route,
update the travel route based on the positional and battery information, and
transmit the updated travel route to the vehicle to be charged.

11. The server apparatus according to claim 1, wherein the another travel route has fewer traffic lights than the travel route.

\* \* \* \* \*